US012193080B2

(12) United States Patent
Zhu et al.

(10) Patent No.: US 12,193,080 B2
(45) Date of Patent: Jan. 7, 2025

(54) METHODS AND SYSTEM FOR CARRYING OUT A HANDOVER OF A MOBILE COMMUNICATION DEVICE BETWEEN DIFFERENT ACCESS NETWORKS

(71) Applicant: ZTE Corporation, Guangdong (CN)

(72) Inventors: Jinguo Zhu, Guangdong (CN); Zhendong Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 757 days.

(21) Appl. No.: 16/947,989

(22) Filed: Aug. 26, 2020

(65) Prior Publication Data

US 2020/0389829 A1 Dec. 10, 2020

Related U.S. Application Data

(63) Continuation of application No. PCT/CN2018/078468, filed on Mar. 8, 2018.

(51) Int. Cl.
*H04W 36/14* (2009.01)
*H04W 36/00* (2009.01)
(Continued)

(52) U.S. Cl.
CPC ........ *H04W 76/11* (2018.02); *H04W 36/0011* (2013.01); *H04W 48/18* (2013.01); *H04W 36/144* (2023.05)

(58) Field of Classification Search
CPC .. H04W 76/11; H04W 36/0011; H04W 48/18
(Continued)

(56) References Cited

U.S. PATENT DOCUMENTS 8,068,480 B2 * 11/2011 Yamamoto ........ H04W 36/0011 370/352
8,144,659 B2 * 3/2012 Yamamoto ........ H04W 36/0011 370/401
(Continued)

FOREIGN PATENT DOCUMENTS

CN 106851589 A 6/2017
CN 106982458 A 7/2017

OTHER PUBLICATIONS

"Network slicing and Interworking with EPS", Ericsson, 3GPP TSG-SA WG2 Meeting #125 S2-180108, pp. 1-12. published Jan. 26, 2018 (Year: 2018).*
(Continued)

*Primary Examiner* — Titus Wong
(74) *Attorney, Agent, or Firm* — Perkins Coie LLP

(57) ABSTRACT

A method of handing over a mobile communication device from a first access network to a second access network (in one implementation) is as follows. In response to a protocol data unit session update request, a first computing device (e.g., an AMF) receives an identifier of a protocol data unit session and network slice information regarding a network slice to be used by the mobile communication device to communicate on the second access network using the protocol data unit session. The first computing device uses the network slice information to select a network slice instance and to select a second computing device (e.g., another AMF) within the network slice instance. The first computing device transmits, to the second computing device, a relocation request that includes the network slice information and the identifier of the protocol data unit session.

20 Claims, 6 Drawing Sheets

(51) Int. Cl.
*H04W 48/18* (2009.01)
*H04W 76/11* (2018.01)

(58) Field of Classification Search
USPC .............................................................. 711/1
See application file for complete search history.

(56) References Cited

U.S. PATENT DOCUMENTS

| | | | | |
|---|---|---|---|---|
| 9,451,521 | B2 * | 9/2016 | Kapoulas | H04W 36/0061 |
| 2007/0195818 | A1 * | 8/2007 | Stephenson | H04W 28/20 370/468 |
| 2011/0269465 | A1 * | 11/2011 | Xu | H04W 36/0033 455/436 |
| 2015/0141021 | A1 * | 5/2015 | Kapoulas | H04W 36/32 455/441 |
| 2016/0156513 | A1 * | 6/2016 | Zhang | H04L 67/10 709/220 |
| 2016/0360408 | A1 * | 12/2016 | Senarath | H04L 41/0896 |
| 2017/0070892 | A1 * | 3/2017 | Song | H04L 41/042 |
| 2017/0079059 | A1 * | 3/2017 | Li | H04W 16/02 |
| 2017/0086118 | A1 * | 3/2017 | Vrzic | H04W 36/26 |
| 2017/0141973 | A1 * | 5/2017 | Vrzic | H04W 76/11 |
| 2017/0164212 | A1 * | 6/2017 | Opsenica | G06F 16/41 |
| 2017/0295409 | A1 * | 10/2017 | Simon | H04L 9/40 |
| 2017/0303259 | A1 * | 10/2017 | Lee | H04W 28/16 |
| 2017/0332421 | A1 * | 11/2017 | Sternberg | H04W 76/11 |
| 2017/0339609 | A1 | 11/2017 | Youn et al. | |
| 2018/0192445 | A1 | 7/2018 | Jiang | |
| 2020/0059989 | A1 * | 2/2020 | Velev | H04W 8/08 |

OTHER PUBLICATIONS

European Communication pursuant to Article 94(3) EPC for EP Patent Application No. 18909038.4, dated Mar. 21, 2023, 9 pages.
EGPP TS 23.501 V15.0.0, Dec. 2017, Technical Specification, 3rd Generation Partnership Project; Technical Specification Group Services and System Aspects; System Architecture for the 5G System; Stage 2; (Release 15), 181 pages.
HTC, "Association of slice id to PDU session id after EPC to 5GC mobility," SA WG2 Meeting #124, Reno, Nevada, US, Nov. 27-Dec. 1, 2017, S2-178640, 8 pages.
ZTE, "TS 23.501 mobility from EPC to 5GC," SA WG2 Meeting #126, Feb. 26-Mar. 2, 2018, Montreal, Canada, S2-181541, 2 pages.
Extended European Search Report for EP Patent Application No. 18909038.4, dated Nov. 9, 2021, 11 pages.
Japanese Decision of Patent issued in JP Patent Application No. 2020-546990, dated Apr. 11, 2023, 5 pages. English translation included.
Motorola Mobility et al., "Slicing configuration update," 3GPP TSG-SA2 Meeting #126, S2-182922, (Revision of S2-182857, 2831, 2764, 2219), Feb. 26-Mar. 2, 2018, Montreal, Canada, 8 pages.
ZTE, "Solution for Key issue#2," SA WG2 Meeting #127bis, S2-185427 (revision of S2-18xxxx), Newport Beach, California, USA, May 28-Jun. 1, 2018, 3 pages.
Ericsson "Network slicing and Interworking with EPS," 3GPP TSG-SA WG2 Meeting #125, Gothenburg, Sweden, Jan. 22-26, 2018, S2-180106, 4 pages.
Ericsson "Network slicing and Interworking with EPS," 3GPP TSG-SA WG2 Meeting #125, Gothenburg, Sweden, Jan. 22-26, 2018, S2-180107, 6 pages.
Ericsson, "Network slicing and Interworking with EPS", 3GPP TSG-SA WG2 Meeting #125, Gothenburg, Sweden, S2-180108, 12 pages, Jan. 2018.
International Search Report and Written Opinion mailed on Nov. 28, 2018 for International Application No. PCT/CN2018/078468, filed on Mar. 8, 2018 (6 pages).
Ericsson "Slice and AMF selection at HO procedure," 3GPP TSG-SA WG2 Meeting #125, Gothenburg, Sweden, Jan. 22-26, 2018, S2-180111, 26 pages.
European Communication under Rule 71(3) EPC issued in EP Patent Application No. 18909038.4, dated Oct. 12, 2023, 31 pages.
Vietnamese Notice of Allowance issued in VN Patent Application No. 1-2020-05394, dated Sep. 25, 2023, 2 pages. English translation included.
Chinese office action issued in CN Patent Application No. 201880084962.6, dated Apr. 29, 2021, 11 pages. English translation included.
Chinese office action issued in CN Patent Application No. 201880084962.6, dated Oct. 11, 2021, 8 pages. English translation included.
Chinese office action issued in CN Patent Application No. 201880084962.6, dated Feb. 10, 2022, 11 pages. English translation included.
Chinese Notification to Complete Formalities of Registration issued in CN Patent Application No. 201880084962.6, dated Aug. 9, 2022, 4 pages. English translation included.

* cited by examiner

METHODS AND SYSTEM FOR CARRYING OUT A HANDOVER OF A MOBILE COMMUNICATION DEVICE BETWEEN DIFFERENT ACCESS NETWORKS

CROSS REFERENCE TO RELATED APPLICATIONS

This patent document is a continuation of and claims the benefit of priority to International Patent Application No. PCT/CN2018/078468, filed on Mar. 8, 2018. The entire contents of the before-mentioned patent applications are incorporated by reference as part of the disclosure of this application.

TECHNICAL FIELD

The present disclosure is related generally to wireless networks and, more particularly, to methods and a system for carrying out a handover of a mobile communication device between different access networks.

BACKGROUND

In the current handover procedure from an Evolved Packet System ("EPS") to a Fifth Generation System ("5GS"), it is not possible to select a correct target Access Management Function ("AME") because the Mobility Management Entity ("MME") does not possess information about the Single-Network Slice Selection Assistant Information ("S-NSSAI") (used for slice selection).

SUMMARY

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
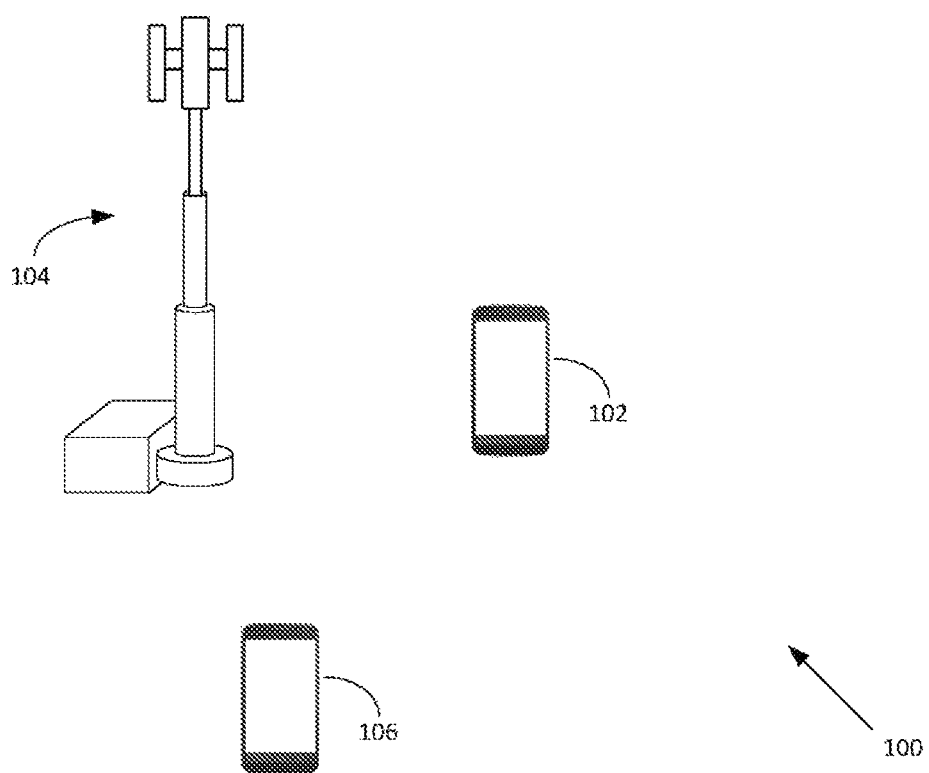
FIG. 1 is a diagram of a system in which various embodiments of the disclosure are implemented.

The disclosure is generally directed to a method and system for carrying out a handover from a first access network to a second access network, in which an intermediate AMF is selected by the MME, the intermediate AMF selects a default V-SMF and receives S-NSSAI, PDU Session ID from PGW-C+SMF. The intermediate AMF further carries out slice selection, selects a correct AMF and forwards the relocation request to the final target AMF. The intermediate AMF then remove the resource of default V-SMF.

In an embodiment, a method for conducting a handover of a mobile communication device from a first access network to a second access network involves the following steps.: In response to a protocol data unit session update request, a first computing device (e.g., a first AMF) receives an identifier of a protocol data unit session and network slice information regarding a network slice to be used by the mobile communication device to communicate on the second access network using the protocol data unit session. The first computing device uses the network slice information to select a network slice instance and to select a second computing device (e.g., a second AMF) within the network slice instance. The first computing device transmits, to the second computing device, a relocation request that includes the network slice information and the identifier of the protocol data unit session.

In an embodiment, the first computing device carries out an access and mobility management function of a core network communicatively linked to the first access network and the second computing device carries out an access and mobility management function of the core network.

According to an embodiment, the first access network is an evolved packet system and the method includes the following additional steps: The first computing device receives, from a mobility management entity of the first access network, a mobility management context of the first access network. The first computing device maps the mobility management context of the first access network to a mobility management context of the second access network. The first computing device transmits the mapped mobility management context to the second computing device.

In an embodiment, a method for conducting a handover of a mobile communication device from a first access network to a second access network involves the following steps: A first computing device (e.g., a first AMF) that carries out an access and mobility management function for the first access network transmits a protocol data unit session update request to a second computing device (e.g., a first V-SMF) that carries a session management function for the second access network. The first computing device receives, from the second computing device, an identifier of a protocol data unit session and network slice information regarding a network slice to be used by the mobile communication device to communicate on the second access network using the protocol data unit session. The first computing device uses the network slice information to select a network slice instance and to select a third computing device (e.g., a second AMF) within the network slice instance, wherein the third computing device carries out an access and mobility management function for the second access network. The first computing device transmits, to the third computing device, a relocation request that includes the network slice information, the identifier of the protocol data unit session, and session management information used to communicate on the second access network.

According to an embodiment, the first communication access network is an evolved packet system and the method further includes the following additional steps: The first computing device receives, from a mobility management entity of the first access network, a mobility management context of the first access network. The first computing device maps the mobility management context of the first access network to a mobility management context of the second access network. The first computing device transmits the mapped mobility management context to the third computing device.

In an embodiment, the protocol data unit session update request includes an evolved packet system bearer context.

According to an embodiment, the second computing device selects a fourth computing device (e.g., a first V-UPF) to allocate user plane resources for the protocol data unit session, wherein the fourth computing device carries out a user plane function for the second access network. In an embodiment, the first computing device transmits, to the second computing device a request for a deletion of the user plane resources on the fourth computing device. According to an embodiment, the fourth computing device deletes the user plane resources.

In an embodiment, the method involves the following additional steps: The third computing device (a) selects a fifth computing device (e.g., a second V-SMF) to carry out a session management function for the second access network, and (b) transmits a protocol data unit session update request to the fifth computing device. The fifth computing device (a) selects a sixth computing device (e.g., a second V-UPF) to carry out a user plane function for the second access network, and (b) transmits a protocol data unit session update request to a seventh computing device (e.g., an SMF+PGW-C).

According to an embodiment, the protocol data unit session update request includes an address of a fourth computing device (e.g., an SMF+PGW-C) that carries out a session management function and a packet data network gateway control plane function and the second computing device transmits a protocol data unit update request to the fourth computing device.

In an embodiment, the third computing device selects a fourth computing device (e.g., a V-SMF2) to carry out a session management function for the second access network. The third computing device transmits a protocol data unit session update request to the fourth computing device.

FIG. 1 depicts a communication system 100 in which the various embodiments described herein may be implemented. The communication system 100 includes several wireless communication devices ("wireless communication device" will sometimes be shortened herein to "communication device" or "device" for convenient reference). The communication devices depicted are a first communication device 102 (depicted as a user equipment ("UE")), a second communication device 104 (depicted as a base station), and a third communication device 106 (depicted as a UE). It is to be understood that there may be many other communication devices and that the ones represented in FIG. 1 are meant only for the sake of example. In an embodiment, the wireless communication system 100 has many other components that are not depicted in FIG. 1, including other base stations, other UEs, wireless infrastructure, wired infrastructure, and other devices commonly found in wireless networks. Possible implementations of the communication devices include any device capable of wireless communication, such as a smartphone, tablet, laptop computer, and non-traditional devices (e.g., household appliances or other parts of the "Internet of Things"). When operating as part of a wireless communication system, a wireless communication device may be referred to as a "wireless network node." A wireless communication device communicates primarily by transmitting and receiving wireless signals.

The following description will sometimes refer to a node and a UE without specific reference to FIG. 1. It is to be understood, however, that all of the methods described herein may be carried out by the communication devices of FIG. 1, and that references to a node, base station, and UE in a general manner are merely for convenience. Also, for each of the procedures described, in an embodiment, the steps are carried out in the order that the language sets forth. In other embodiments, the steps are carried out in different orders.

Figure 2:
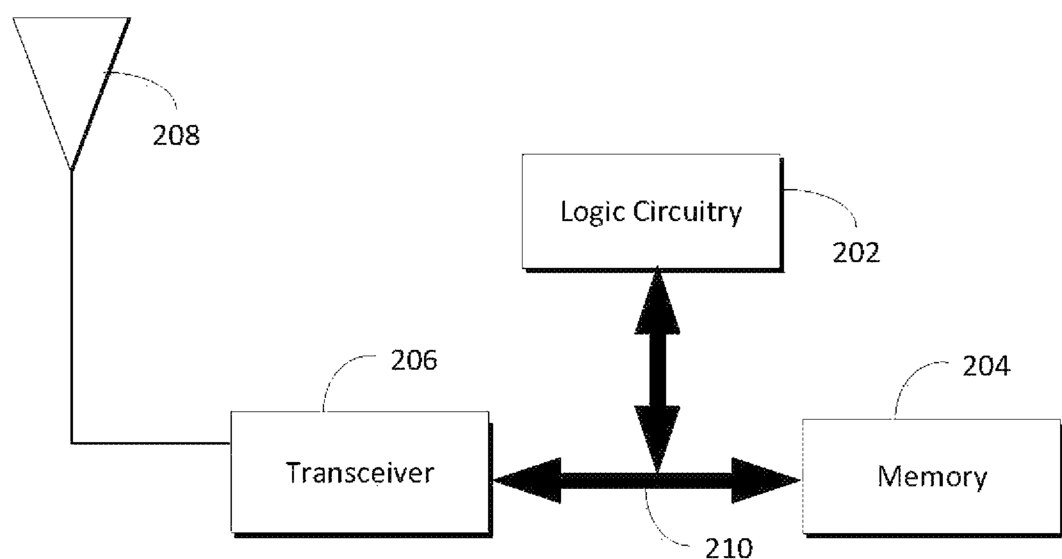
FIG. 2 shows an example hardware architecture of a communication device.

FIG. 2 illustrates a basic hardware architecture implemented by each of the wireless communication devices of FIG. 1, according to an embodiment. The elements of FIG. 1 may have other components as well. The hardware architecture depicted in FIG. 2 includes logic circuitry 202, memory 204, transceiver 206, and one or more antennas represented by antenna 208 (including transmit antennas and/or receive antennas). The memory 204 may be or include a buffer that, for example, holds incoming transmissions until the logic circuitry is able to process the transmission. Each of these elements is communicatively linked to one another via one or more data pathways 210. Examples of data pathways include wires, conductive pathways on a microchip, and wireless connections.

The term "logic circuitry" as used herein means a circuit (a type of electronic hardware) designed to perform complex functions defined in terms of mathematical logic. Examples of logic circuitry include a microprocessor, a controller, or an application-specific integrated circuit. When the present disclosure refers to a device carrying out an action, it is to be understood that this can also mean that logic circuitry integrated with the device is, in fact, carrying out the action.

Figure 3:
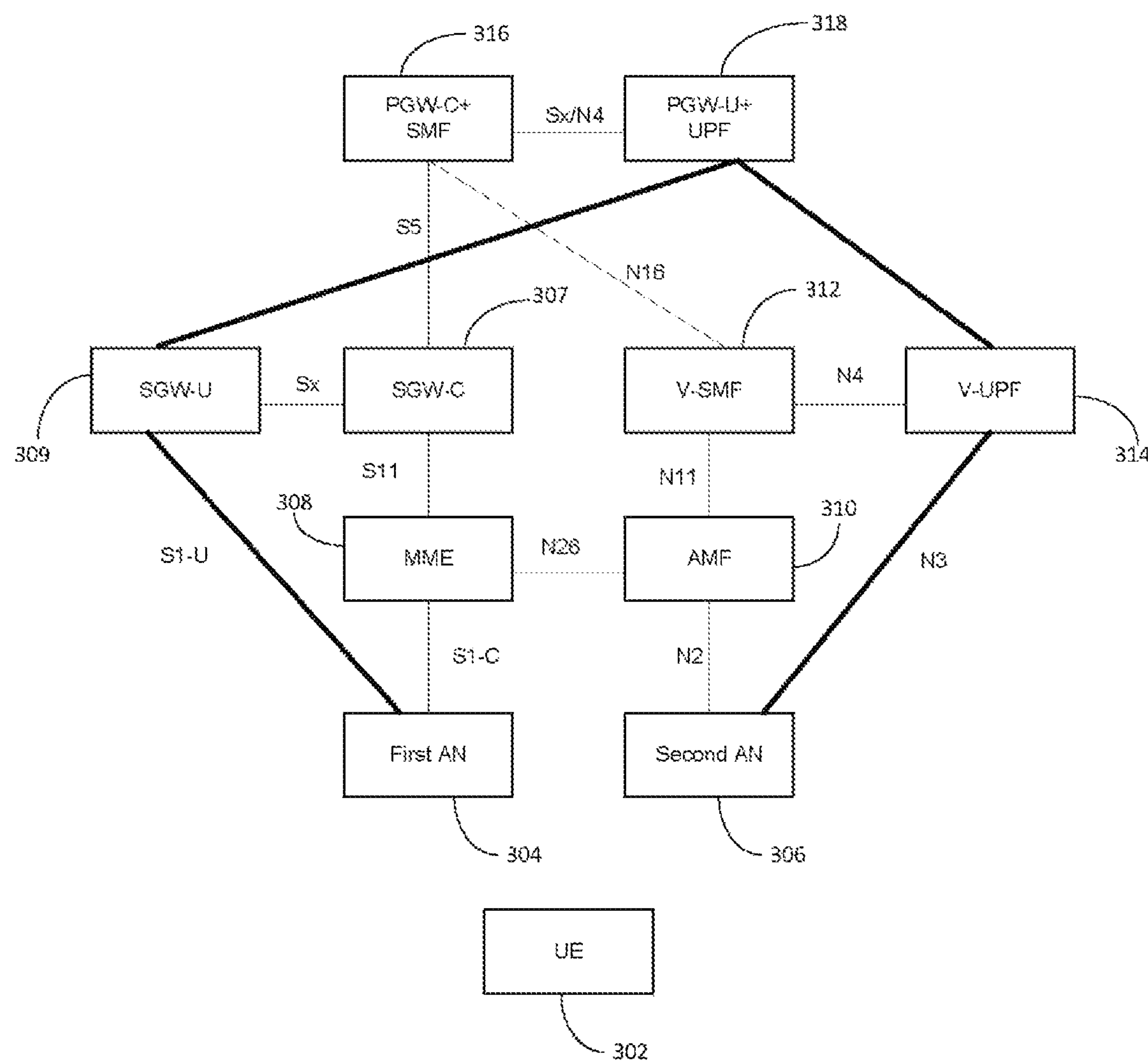
FIG. 3 illustrates an architecture for a mobile communication system in which the various embodiments described herein may be used.

FIG. 3 illustrates an architecture for a mobile communication system ("system") 300 in which the various embodiments described herein may be used. The elements depicted in FIG. 3 are often referred to herein as "functions." However, it is to be understood that these functions are, in fact, carried out by actual computing devices (e.g., under the control of software), and that any given "function" (such as an access management function) is (according to an embodiment) an actual computing device (with the architecture depicted in FIG. 2) operating within a network (such as a core network of a mobile communication system).

The system 300 includes a representative user equipment ("UE") 302 (also referred to as a "wireless communication device," "communication device," or "device" for convenient reference), a first access network ("AN") 304 (e.g., a fourth generation ("4G") access network, which may include a wireless (e.g., radio) access network as well as wired access network) and a second access network ("AN") (e.g., a fifth generation ("5G") access network, which may include a wireless (e.g., radio) access network as well as wired access network) 306. The system 300 also includes components that support the first AN 304 and the second AN 306. Supporting the first AN 304 are a mobility management entity ("MME") 308, a serving gateway (control pane) ("SGW-C") 307, a serving gateway (user pane) ("SGW-U") 309, a packet data network ("PDN") Gateway Control plane ("PGW-C") function, and a PDN Gateway User plane ("PGW-U") function.

Supporting the second access network 306 are an access and mobility management function ("AMY") 310, a visited session management function ("V-SMF") 312, a visited user plane function ("V-UPF") 314, a session management function ("SMF"), and a user plane function ("UPF"). The PGW-C and the SMF are collocated and are collectively referred to as PGW-C+SMF 316. The PGW-U and UPF are collocated and are collectively referred to as PGW-U+UPF 318.

In one implementation, the components that support the first AN 304 are for a 4G Evolved Packet System. As such, an eNodeB is the basic unit in a 4G radio access network, and manages the 4G radio resources of the UE 302. The MME 308 manages both UE mobility and UE PDN connection. It hold both mobility management ("MM") context and session management ("SM") context. The SGW-C is the anchor for handovers between eNodeBs. The PGW is the anchor that is kept unchanged during UE mobility so that the internet protocol ("IP") address can be preserved.

In one implementation, the components that support the second AN 306 are for a fifth generation access network ("5GAN"). 5GAN is the basic unit that manages the 5G radio resources of the UE. Unlike in 4G, the mobility management and session management are split. The AMF manages the UE mobility and holds the UE MM context. The SMF manages the UE PDU session and holds the SM contexts. The anchor SMF also needs to be kept unchanged during mobility.

For PDN connection or PDU session, the control plane and user plane are separated. The SGW-U and UPF constitute the user plane function that provides packet routing and forwarding, traffic usage reporting, quality of service ("QoS") handling for the user plane, downlink packet buffering and downlink data notification triggering, etc. For a roaming with home routed case, there are SGW or V-SMF in the visited network.

In order to achieve seamless handover between EPS and 5GS, the PGW-C and anchor SMF are be co-located. The respective PGW-U and anchor UPF are also co-located.

Interface N26 is used between AMF and MME, which provides a subset of the functions of the interface between MMES. In order not to impact the MME, from the MME perspective, the AMF can be regarded as another MME.

"Network Slice" as used herein is a logical network that provides specific network capabilities and network characteristics. A "Network Slice instance" is a set of Network Function instances and the required resources (e.g., computing, storage, and networking resources) that form a deployed Network Slice. Typically, the AMF can be shared by some network slice instances while the SMF and UPF are different for each network slice instance.

An S-NSSAI (Single-Network Slice Selection Assistant Information) is used to identify a Network Slice. An S-NSSAI is comprised of a Slice/Service type ("SST"), which refers to the expected Network Slice behavior in terms of features and services; and, optionally, a Slice Differentiator ("SD"), which is optional information that complements the Slice/Service type(s) to differentiate amongst multiple Network Slices of the same Slice/Service type. An S-NSSAI can have standard values (i.e., such S-NSSAI is only required to have an SST with a standardized SST value, and no SD) or non-standard values.

An "NSSAI" is a collection of S-NSSAIs.

During a registration procedure, the UE provides its requested NSSAI to the AN (e.g., to the 5GAN). The AN selects the AMF based on the requested NSSAI and forwards the registration request message to the selected AMF. The AMF further generates the Allowed NSSAI based on the Requested NSSAI, Subscribed NSSAI, UE location and operator policy. The AMF may query the NSSF (Network Slice Selection Function) to generate the Allowed NSSAI. The AMF return the Allowed NSSAI to UE. If the current AMF is not suitable to serve the UE, the AMF may select another target AMF and forward the UE registration message to the target AMF and the target AMF will serve the UE.

During a PDU session establishment procedure (e.g., in 5G), the UE provides a Requested S-NSSAI to AMF. The AMF selects a suitable network slice instance and the SMF serving the PDU session in this network slice instance. The AMF selects the network slice instance according to its own configuration or query the NSSF.

Figure 4:
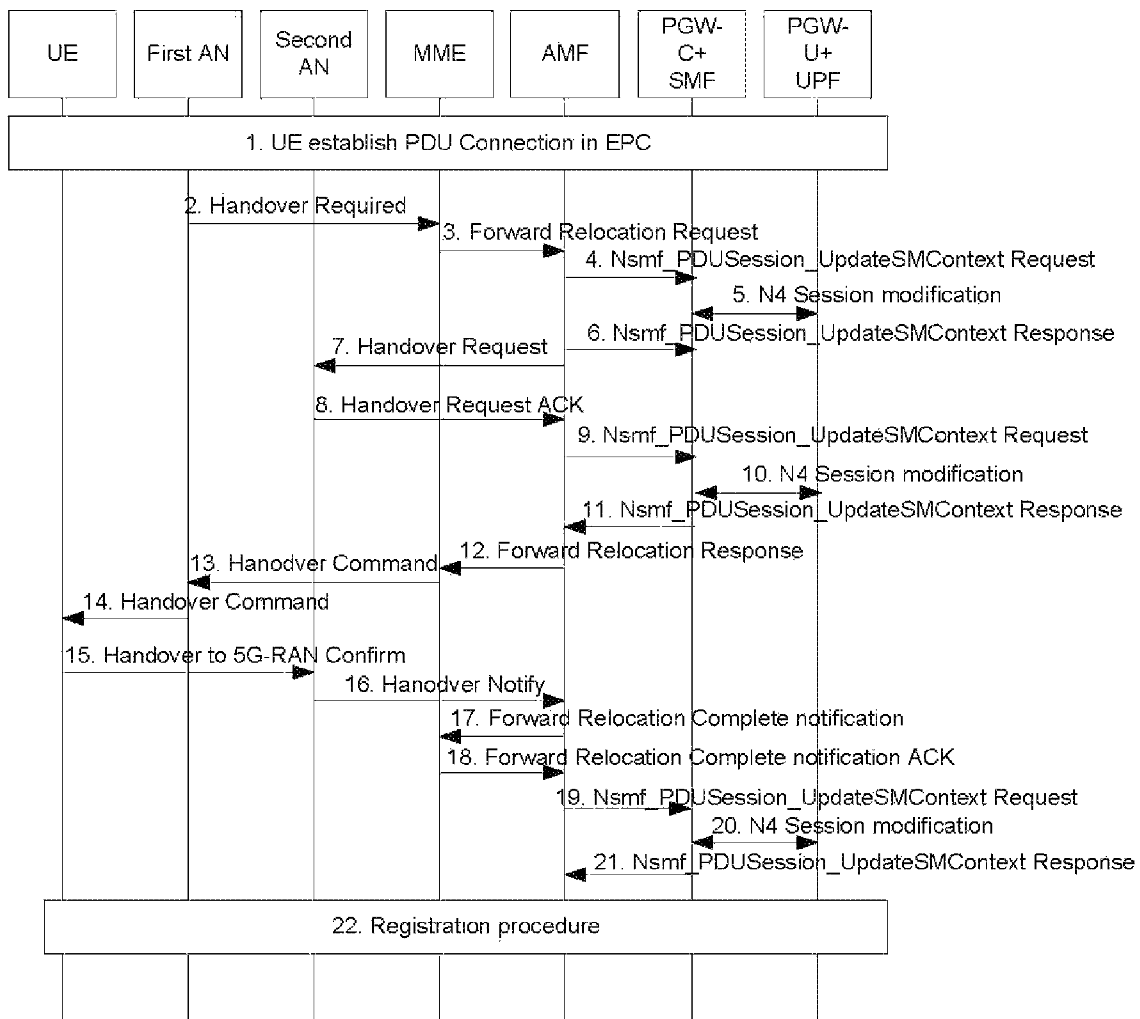
FIG. 4 depicts an existing procedure for carrying out a handover from a first access network to a second access network for a non roaming case.

Turning to FIG. 4, an existing procedure for carrying out a handover from a first access network to a second access network (e.g., 4G to 5G) for a non roaming case is shown. Because no roaming is involved, no V-SMF is needed.

1. The UE establishes a PDN connection in the first access network (e.g., in 4G). As the UE supports the second access network (e.g., supports 5G), a collocated PGW-C and anchor SMF are selected to serve the PDN connection. The UE also allocates a PDU Session ID and provide it to the PGW-C+SMF, and the PGW-C+SMF allocates a S-NSSAI and provides it to UE. The PDU Session ID and S-NSSAI are used in the second access network. The MME transparently transfers the PDU Session ID and the S-NSSAI between the UE and the PGW-C+SMF.

2. The source node (e.g., source eNodeB) decides that the UE should be handed over to the second access network (e.g., to a 5GAN) and sends a Handover Required (Target AN Node ID (e.g., Target 5GAN Node ID), Source to Target Transparent Container) message to the MME.

3. The MME selects the target AMF and sends a Forward Relocation Request (Target AN Node ID (e.g., Target 5GAN Node ID), Source to Target Transparent Container, EPS MM Context, EPS Bearer Context(s)) message to the selected AMF. The AMF converts the received EPS MM Context into the MM Context of the second access network (e.g., the 5GS MM Context). This includes converting the EPS security context into a mapped security context (e.g., a mapped 5G security context). The MME UE context includes IMSI, ME Identity, UE security context, and UE Network Capability. An EPS Bearer context includes the PGW-C+SMF address and APN.

4. The AMF invokes the Nsmf_PDUSession_UpdateSMContext service operation (EPS Bearer Context(s)) on the SMF identified by the PGW-C+SMF address received in step 3.

5. The PGW-C+SMF may modify the PGW-U+UPF.

6. The PGW-C+SMF sends an Nsmf_PDUSession_UpdateSMContext Response (PDU Session ID, N2 SM Information (PDU Session ID, QoS Rules, core network ("CN") Tunnel-Info)) to the AMF.

7. The AMF sends a Handover Request (Source to Target Transparent Container, N2 SM Information (PDU Session ID, QoS Flow Identifier(s) ("QFI(s)"), QoS Profile(s), core network ("CN") Tunnel Info)) message to the second access network (e.g., 5GAN).

8. The second access network (e.g., 5GAN) reserves the radio resources for the accepted QoS flow and sends a Handover Request Acknowledge (Target to Source Transparent Container, N2 SM response (PDU Session ID, list of accepted QFI(s) and AN Tunnel Info)) message to the AMF.

9. The AMF sends an Nsmf_PDUSession_UpdateSMContext Request (PDU Session ID, N2 SM response (list of accepted QFI(s) and AN Tunnel Info)) message to the SMF for updating N3 tunnel information.

10. The SMF derives, from this received list, the QoS flows that should be mapped to the PDU Session and informs the UPF regarding this mapping.

11. PGW-C+SMF to AMF: Nsmf_PDUSession_UpdateSMContext Response (PDU Session ID, EPS Bearer Setup List). The EPS Bearer Setup list is a list of EPS bearer Identifiers successfully handover to the core network of the second access network (e.g., the 5GC), which is generated based on the list of accepted QFI(s).

12. The AMF sends the message Forward Relocation Response (Cause, Target to Source Transparent Container, Serving gateway ("GW") change indication, EPS Bearer Setup List, AMF Tunnel Endpoint Identifier for Control Plane) to the MME.

13. The MME sends a Handover Command (Target to Source Transparent Container) message to the source node (e.g., the source eNodeB).

14. The source node (e.g., the source eNodeB) commands the UE to hand over to the second access network (e.g., to a 5GAN) by transmitting a handover command message to the UE. This message includes a transparent container including radio aspect parameters that the target access network has reserved in the preparation phase.

15. Handover Confirm: the UE confirms handover to the second access network (e.g., to the 5GAN). The UE moves from the node of the first access network (e.g., from the enhanced Node B ("eNodeB")) and synchronizes with the target (second) access network (e.g., 5GAN). The UE may resume the uplink transmission of user plane data for those QFIs and Session IDs for which there are radio resources allocated in the second access network.

16. Handover Notify: the second access network (e.g., the 5GAN) notifies to the AMF that the UE is handed over to the second access network.

17. At this point, the AMF knows that the UE has arrived to the target access network and informs the MME by sending a Forward Relocation Complete Notification message.

18. The MME responds with a Forward Relocation Complete Notification Ack message.

19. AMF to PGW-C+SMF: Nsmf_PDUSession_UpdateSMContext Request (Handover Complete indication for PDU Session ID).

20. The PGW-C+SMF may update the UPF+PGW-U with the AN Tunnel Info.

21. PGW-C+SMF to AMF: Nsmf_PDUSession_UpdateSMContext Response (PDU Session ID). The PGW-C+SMF confirms reception of Handover Complete.

22. The UE carries out a Mobility Registration Procedure (e.g., an EP S to 5GS Mobility Registration Procedure) to retrieve UE subscription information from UDM.

A problem with this procedure is that, during the handover from the first access network to the second access network (e.g., from 4G to 5G), the target AMF is selected by the MME according UE location. As network slice is not supported by the first access network (e.g., is not supported in 4G), the MME cannot be provided with the S-NSSAI of each corresponding PDN connection. Thus, the target AMF selected by the MME may not be suitable to serve all active PDU connections of the UE.

To address this problem, in an embodiment, the S-NSSAI and PDU Session ID is returned to the initial AMF selected by the source MME. Then the initial AMF determines the network slice instance, selects the target AMF in the network slice instance, and forwards the handover message to target AMF in the network slice instance. This technique takes advantage of the fact that the PGW-C+SMF "knows" (i.e., has data regarding) the S-NSSAI for each PDN connection.

Figure 5:
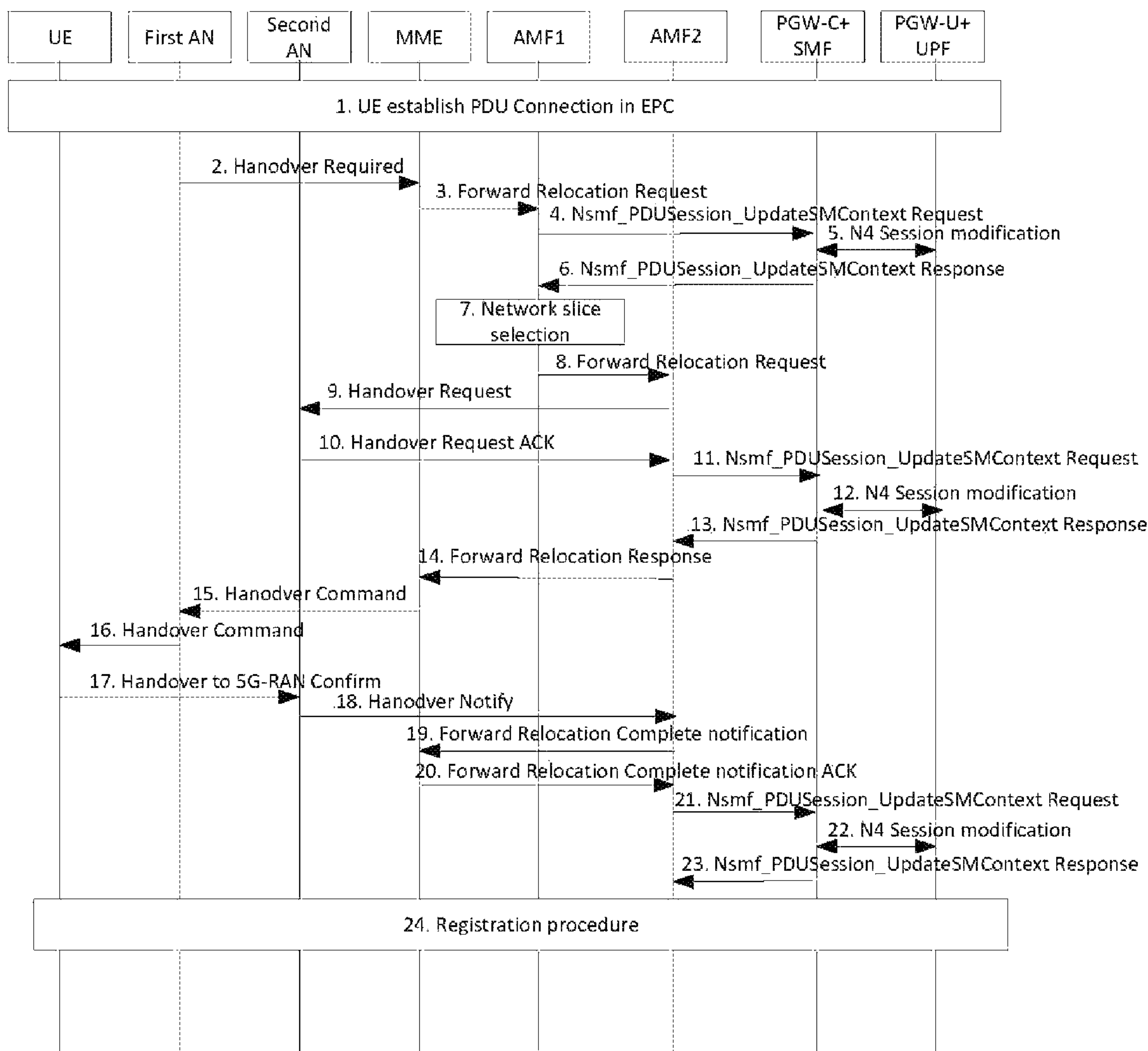
FIG. 5 depicts an existing procedure for handing over a mobile communication device from a first access network to a second access network according to an embodiment (non-roaming case).

Turning to FIG. 5, a procedure for handing over a mobile communication device from a first access network to a second access network according to an embodiment will now be described. As with the example of FIG. 4, the procedure of FIG. 5 is for the non-roaming case.

1. The UE establishes a PDN connection in the first access network (e.g., in 4G). As the UE supports the second access network (e.g., 5G), a collocated PGW-C and anchor SMF ("PGW-C+SMF") are selected to serve the PDN connection. The UE also allocates a PDU Session ID and provide it to PGW-C+SMF, and the PGW-C+SMF allocates a S-NSSAI and provides it to UE. The PDU Session ID and S-NSSAI is used in the second access network (e.g., 5G). The MME transparently transfers the PDU Session ID and the S-NSSAI between the UE and the PGW-C+SMF.
2. The source node (e.g., source eNodeB) decides that the UE should be handed over to the second access network (e.g., to a 5G-AN) and sends a Handover Required message to the MME. The message includes a Target AN Node ID (e.g., Target 5G AN Node ID) and a Source to Target Transparent Container).
3. The MME selects the target AMF (AMF1 in this example) and sends a Forward Relocation Request message to the selected AMF (AMF1). The message includes: Target AN Node ID (e.g., Target 5GAN Node ID), a Source to Target Transparent Container, EPS MM Context, and EPS Bearer Context(s). AMF1 converts the received EPS MM Context into the MM Context of the second access network (e.g., 5G MM Context). This includes converting the EPS security context into a mapped security context (e.g., a mapped 5G security context). The MME UE context includes International Mobile Subscriber Identity ("IMSI"), mobile equipment ("ME") Identity, UE security context, and UE Network Capability. An EPS Bearer context includes the PGW-C+SMF address and access point name ("APN").
4. AMF1 invokes the Nsmf_PDUSession_UpdateSMContext service operation on the SMF identified address received in step 3 (the address of PGW-C+SMF in this example). AMF1 does this by transmitting a Nsmf_PDUSession_Update SMContext request message to the PGW-C+SMF. The message includes EPS Bearer Context(s) and the ID of AMF1 (AMF1 ID).
5. The PGW-C+SMF may modify the PGW-U+UPF.
6. The PGW-C+SMF sends a Nsmf_PDUSession_UpdateSMContext Response (PDU Session ID, N2 SM Information (PDU Session ID, QoS Rules, CN Tunnel-Info, S-NSSAI), S-NSSAI) to the AMF1.
7. The AMF1 carries out network slice instance selection and selects the target AMF2 based on the S-NSSAI received in step 6.
8. The AMF1 forwards the Forward Relocation Request (Target 5GAN Node ID, Source to Target Transparent Container, EPS MM Context, EPS Bearer Context(s), N2 SM Information received from PGW-C+SMF, S-NSSAI) message to the selected AMF2. Optionally the AMF1 provides the mapped 5G MM Context instead of EPS MM Context to AMF2 so the AMF2 doesn't need to perform mapping again.
9. The AMF2 sends a Handover Request (Source to Target Transparent Container, N2 SM Information received from AMF1) message to the 5GAN.
10. The 5GAN reserves the radio resources for the accepted QoS flow and sends a Handover Request Acknowledge (Target to Source Transparent Container, N2 SM response (PDU Session ID, list of accepted QFI(s) and AN Tunnel Info)) message to the AMF2.
11. AMF2 sends an Nsmf_PDUSession_UpdateSMContext Request (PDU Session ID, N2 SM response (list of accepted QFI(s) and AN Tunnel Info)) message to the SMF identified address received in step 8 (the address of PGW-C+SMF in this example) for updating N3 tunnel information.

12. The SMF (i.e., the SMF functionality of the PGW-C+SMF) derives from this received list of QoS flows that should be mapped to the PDU Session and informs the UPF (i.e., informs the UPF functionality of the PGW-U+UPF) regarding this mapping.
13. PGW-C+SMF transmits a Nsmf_PDUSession_UpdateSMContext Response message to AMF2. The message includes PDU Session ID and EPS Bearer Setup List. The EPS Bearer Setup list is a list of EP S bearer Identifiers successfully handover to core network of the second access network (e.g., the 5GC) and is generated based on the list of accepted QFI(s).
14. AMF2 sends a Forward Relocation Response message to the MME. The message includes: Cause, Target to Source Transparent Container, Serving GW change indication, EPS Bearer Setup List, AMF Tunnel Endpoint Identifier for Control Plane. Alternatively, the AMF2 may send the Forward Relocation Response to the MME via AMF1.
15. The MME sends a Handover Command message to the source node (e.g., the source eNodeB). The message includes the Target to Source Transparent Container.
16. The node of the first access network (e.g., the source eNodeB) transmits a handover message to the UE (commanding it to handover to the second access network). This message includes a transparent container including radio aspect parameters that the target access network has reserved in the preparation phase.
17. Handover Confirm: the UE confirms handover to the second access network (e.g., 5GAN). The UE moves from the node of the first access network (e.g., from the eNodeB) and synchronizes with the target access network. The UE may resume the uplink transmission of user plane data for those QFIs and Session IDs for which there are radio resources allocated in the second access network.
18. Handover Notify: the second access network (e.g., 5GAN) notifies AMF2 that the UE has been handed over to the second access network.
19. At this point, the AMF2 knows that the UE has arrived to the target side (i.e., to the second access network) and informs the MME by sending a Forward Relocation Complete Notification message to the MME. This message may be sent directly to the MME directly or sent to the MME via AMF1.
20. The MME responds with a Forward Relocation Complete Notification Ack message.
21. AMF2 transmits an Nsmf_PDUSession_UpdateSMContext Request message to the PGW-C+SMF. The message includes a Handover Complete indication for the PDU Session ID.
22. The PGW-C+SMF updates the UPF+PGW-U with the AN Tunnel Info.
23. The PGW-C+SMF transmits a Nsmf_PDUSession_UpdateSMContext Response message to AMF2. The message includes the PDU Session ID. The PGW-C+SMF confirms reception of Handover Complete with this message.
24. The UE carries out a Mobility Registration Procedure to retrieve the UE's subscription information from the UDM (e.g., an EPS to 5GS Mobility Registration Procedure).

Figure 6A:
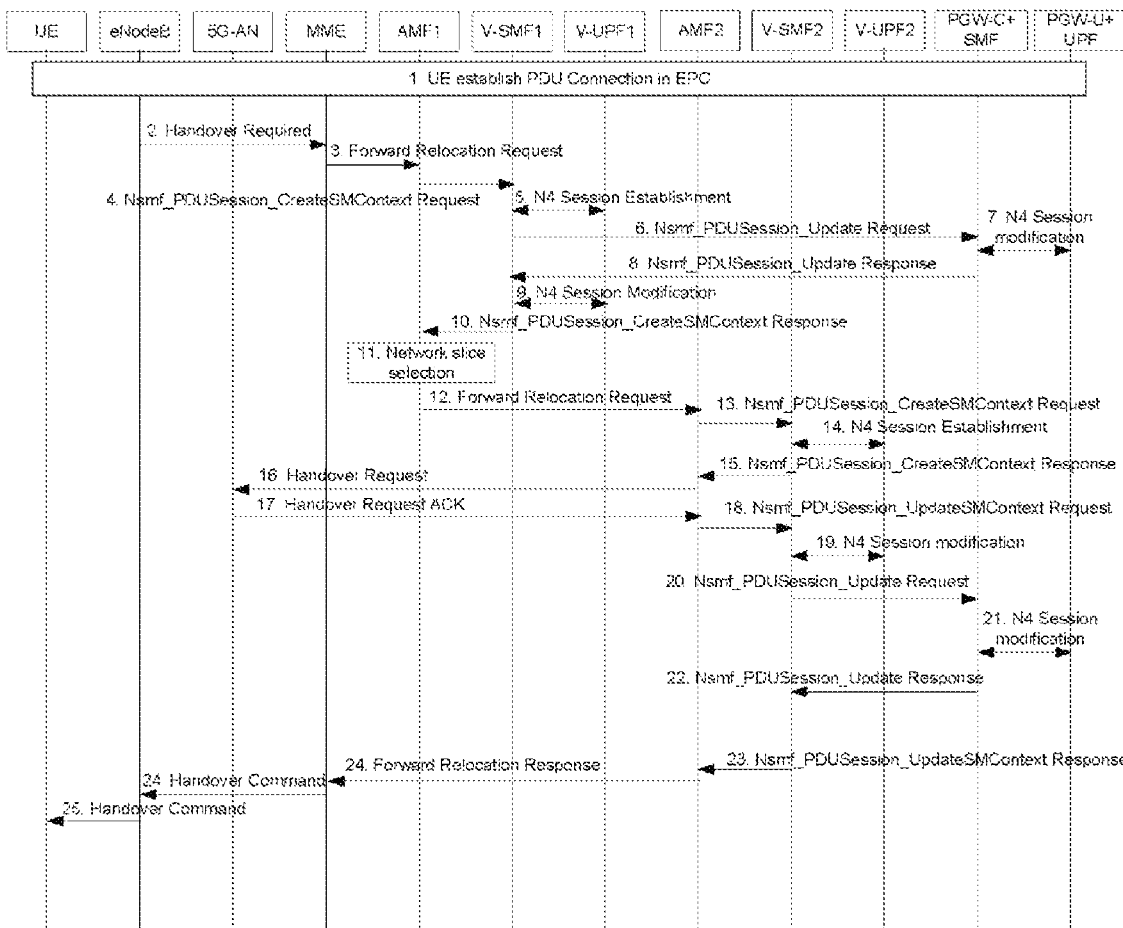
FIG. 6A and FIG. 6B depict a procedure for carrying out a handover from a first access network to a second access network according to an embodiment (roaming and home routed case).
Figure 6B:
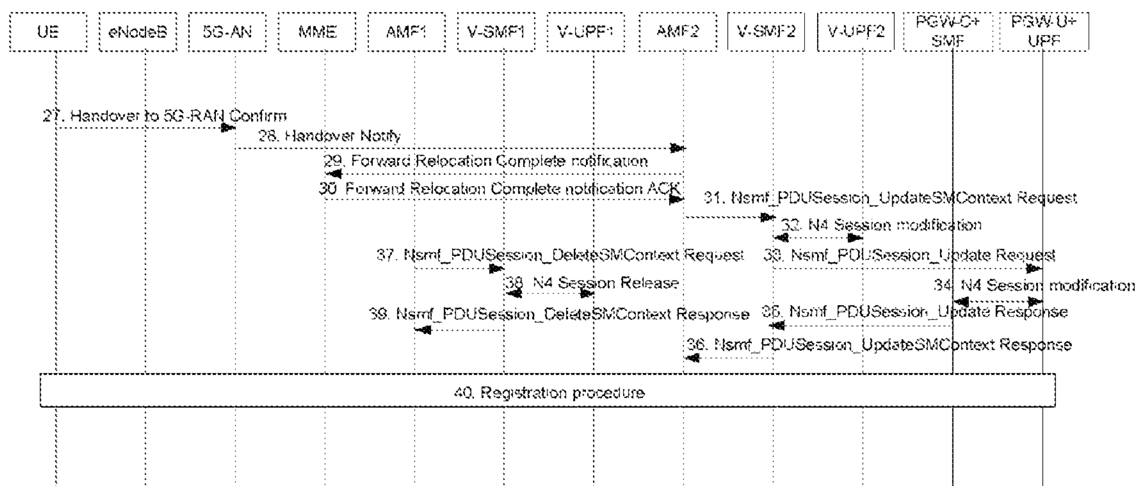

Turning to FIG. 6A and FIG. 6B, a procedure for carrying out a handover from a first access network to a second access network according to an embodiment will now be described. The procedure of FIG. 6A and FIG. 6B is for the roaming and home routed case.

1. The UE establishes a PDN connection in the first access network (e.g., a 4G network). As the UE supports communication with the second access network (e.g., 5G), a collocated PGW-C and anchor SMF are selected to serve the PDN connection. The UE also allocates a PDU Session ID and provides it to PGW-C+SMF. The PGW-C+SMF allocates a S-NSSAI and provides it to the UE. The PDU Session ID and S-NSSAI are used in the second access network (e.g., 5GAN). The MME transparently transfers the PDU Session ID and the S-NSSAI between the UE and PGW-C+SMF.
2. The source node (e.g., an eNodeB) decides that the UE should be handed over to the second access network (e.g., 5GAN) and sends a Handover Required message to the MME. The message includes: Target 5G AN Node ID (e.g., Target 5G AN Node ID) and the Source to Target Transparent Container.
3. The MME selects the target AMF (AMF1 in this example) and sends a Forward Relocation Request message to AMF1. The message includes: Target access network Node ID (e.g., 5GAN Node ID), Source to Target Transparent Container, EPS MM Context, and EPS Bearer Context(s). AMF1 converts the received EPS MM Context into the context of the second access network (e.g., 5GS MM Context). This includes converting the EPS security context into a mapped security context (e.g., a mapped 5G security context). The MME UE context includes IMSI, ME Identity, UE security context, UE Network Capability. An EPS Bearer context includes the PGW-C+SMF address and APN.
4. As AMF1 does not know about the S-NSSAI, it selects a default V-SMF (V-SMF1) for the PDU Session. AMF1 then invokes the Nsmf_PDUSession_UpdateSMContext service operation on the default V-SMF by transmitting a Nsmf_PDUSession_UpdateSMContext request to the default V-SMF (V-SMF1 in this example). The message includes EPS Bearer Context(s) received from the MME.
5. The default V-SMF (V-SMF1 in this example) selects a V-UPF (V-UPF1 in this example) to serve the PDU session. V-SMF1 may establish an N4 Session with V-UPF1 to allocate user plane resources for the PDU session.
6. V-SMF1 then transmits a Nsmf_PDUSession_Update Request to the PGW-C+SMF identified by the PGW-C+SMF address received in step 3. The message includes EPS Bearer Context(s).
7. The PGW-C+SMF modifies the PGW-U+UPF.
8. The PGW-C+SMF sends a Nsmf_PDUSession_Update Response message to V-SMF1. The message includes: H-SM Information (which includes PDU Session ID, QoS Rules, H-CN Tunnel-Info, and S-NSSAI).
9. V-SMF1 may establish or modify the V-UPF1 to allocate N2 CN tunnel information.
10. V-SMF1 sends a Nsmf_PDUSession_UpdateSMContext Response message to AMF1. The message includes: PDU Session ID, N2 SM Information (which includes PDU Session ID, QoS Rules, N2 CN tunnel information, S-NSSAI), S-NSSAI, and home session management ("H-SM") Information received from the PGW-C+SMF.

11. Based on the S-NSSAI received in step 10, AMF1 selects a network slice instance and an AMF (AMF2 in this example) within the selected instance.
12. AMF1 forwards the Forward Relocation Request message to the selected AMF2. The message contains: Target access network Node ID, Source to Target Transparent Container, EPS MM Context, EP S Bearer Context(s), N2 SM Information received from V-SMF1, H-SM Information received from V-SMF1, and S-NSSAI. Optionally, AMF1 provides the mapped MM Context for the second access network (e.g., the mapped 5G MM Context) instead of the EPS MM Context to AMF2 so that the AMF2 does not need to perform mapping again.
13. AMF2 may decide to relocate the V-SMF. If there is no need to reselect the V-SMF, AMF2 uses the N2 SM information received from AMF1 and steps 14 and 15 are skipped. If there is need to relocate the V-SMF, AMF2 selects V-SMF2 based on the S-NSSAI received in step 12. The following description focuses on the V-SMF relocation case: AMF2 invokes the Nsmf_PDUSession_UpdateSMContext service operation on the V-SMF2 by sending an Nsmf_PDUSession_UpdateSMContext request message containing H-SM Information to the V-SMF2.
14. V-SMF2 selects a UPF to serve the PDU session (V-UPF2 in this example). V-SMF2 establishes an N4 Session with V-UPF2 to allocate the N2 tunnel user plane for the PDU Session.
15. V-SMF2 sends a Nsmf_PDUSession_UpdateSMContext Response message to AMF2. The message includes: PDU Session ID, N2 SM Information (which includes PDU Session ID, QoS Rules, N2 CN tunnel information, and S-NSSAI), and S-NSSAI.
16. AMF2 sends a Handover Request message to the second access network. The message includes the Source to Target Transparent Container and N2 SM Information received from AMF1 (in the case of no V-SMF relocation) or N2 SM Information received from V-SMF2 (in the case of V-SMF relocation).
17. The second access network reserves the radio resources for the accepted QoS flow and sends a Handover Request Acknowledge message to AMF2. The message includes: Target to Source Transparent Container, N2 SM response (which includes PDU Session ID, list of accepted QFI(s) and AN Tunnel Info).
18. AMF2 transmits an Nsmf_PDUSession_UpdateSMContext Request message to the V-SMF2. The message includes: PDU Session ID, N2 SM response (list of accepted QFI(s) and AN Tunnel Info). V-SMF2 uses this message to update N3 tunnel information.
19. From this received list, the V-SMF2 derives the QoS flows that should be mapped to the PDU Session, and informs the V-UPF2 regarding this mapping (e.g., provides the mapping to the V-UPF2).
20. V-SMF2 transmits an Nsmf_PDUSession_Update Request message to the PGW-C+SMF identified by the PGW-C+SMF address received in step 13. The message includes PDU Session ID and the list of accepted QFI(s).
21. The PGW-C+SMF may modify the PGW-U+UPF.
22. The PGW-C+SMF sends a Nsmf_PDUSession_Update Response message to V-SMF2. The message includes: PDU Session ID and an EPS Bearer Setup List. The EPS Bearer Setup list is a list of EPS bearer Identifiers successfully handed over to second access network (e.g., to the 5G core network), which is generated based on the list of accepted QFI(s).
23. V-SMF2 transmits a Nsmf_PDUSession_UpdateSMContext Response message to AMF2. The message includes the PDU Session ID and an EPS Bearer Setup List.
24. The AMF2 sends a Forward Relocation Response message directly to the MME. The message includes: Cause, Target to Source Transparent Container, Serving GW change indication, EPS Bearer Setup List, AMF Tunnel Endpoint Identifier for Control Plane. Alternatively, the AMF2 may send the Forward Relocation Response message to the MME via AMF1.
25. The MME sends a Handover Command (Target to Source Transparent Container) message to the base station of the first access network.
26. The base station of the first access network transmits, to the UE, a handover command message (for handover to the second access network). This message includes a transparent container including radio aspect parameters that the second access network has reserved in the preparation phase.
27. Handover Confirm: the UE confirms handover to the second access network. The UE moves from the base station of the first access network and synchronizes with the second access network. The UE may resume the uplink transmission of user plane data for those QFIs and Session IDs for which there are radio resources allocated in the second access network.
28. Handover Notify: the second access network notifies AMF2 that the UE has been handed over to the second access network.
29. At this point, the AMF2 knows that the UE has been handed over to the target network (the second access network). AMF2 informs the MME of this fact by sending a Forward Relocation Complete Notification message to the MME. This message may be sent directly to the MME or sent via AMF1.
30. The MME responds with a Forward Relocation Complete Notification Ack message.
31. AMF2 transmits a Nsmf_PDUSession_UpdateSMContext Request to V-SMF2. The request includes a Handover Complete indication for PDU Session ID.
32. V-SMF2 may update the V-UPF2 with the AN Tunnel Info.
33. V-SMF2 transmits a Nsmf_PDUSession_Update Request to PGW-C+SMF. The request may include the V-UPF tunnel information.
34. PGW-C+SMF may update the UPF+PGW-U with the V-UPF Tunnel Info.
35. PGW-C+SMF transmits a Nsmf_PDUSession_Update Response to V-SMF2.
36. V-SMF2 transmits a Nsmf_PDUSession_UpdateSMContext Response to AMF2. The response includes the PDU Session ID. By way of this message, V-SMF2 confirms reception of Handover Complete.
37. AMF1 transmits a Nsmf_PDUSession_DeleteSMContext Request to V-SMF1. The request may indicate to the V-SMF1 that the V-SMF1 is to release the user plane resource allocated in step 5 if the user plane resource has been allocated. This message also includes an indication that the user plane resource of this PDU session in the home public land mobile network ("PLMN") should not be deleted.
38. V-SMF1 deletes the resource in V-UPF1 (e.g., indicates to V-UPF1 that the resource can be released).

39. V-SMF1 transmits a Nsmf_PDUSession_DeleteSM-Context Response to AMF1.

Steps 37 to 39 may be performed at any time after step 12.

40. The UE carries out a Mobility Registration Procedure (e.g., an EP S to 5GS Mobility Registration Procedure) to retrieve UE subscription information from the Unified Data Management server ("UDM").

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope of as defined by the following claims. For example, the steps of the various methods can be reordered in ways that will be apparent to those of skill in the art.

What is claimed is:

1. A method for conducting a handover of a mobile communication device from a first access network to a second access network, the method:

performed by a first computing device carrying out an access and mobility management function for the first access network and comprising:

transmitting a protocol data unit session update request to a second computing device, wherein the second computing device carries a session management function for the second access network;

receiving, from the second computing device, an identifier of a protocol data unit session and network slice information regarding a network slice to be used by the mobile communication device to communicate on the second access network using the protocol data unit session;

selecting, by the first computing device, a third computing device within a network slice instance selected based on the network slice information, wherein the third computing device carries out an access and mobility management function for the second access network;

transmitting, from the first computing device, to the third computing device, a relocation request that includes the network slice information and the identifier of the protocol data unit session;

receiving, by the first computing device, from a mobility management entity of the first access network, a mobility management context of the first access network, wherein the first access network is an evolved packet system;

mapping, by the first computing device, the mobility management context of the first access network to a mobility management context of the second access network; and transmitting, from the first computing device, to the third computing device, the mobility management context of the second access network that is mapped to the mobility management context of the first access network.

2. The method of claim 1, wherein the second computing device is configured to select a fourth computing device to allocate user plane resources for the protocol data unit session, wherein the fourth computing device carries out a user plane function for the second access network.

3. The method of claim 2, further comprising:

transmitting, to the second computing device, a request for a deletion of the user plane resources in the fourth computing device.

4. The method of claim 2, wherein the third computing device is configured to:

select a fifth computing device to carry out the session management function for the second access network, and transmit the protocol data unit session update request to the fifth computing device, and wherein the fifth computing device is configured to:

select a sixth computing device to carry out a user plane function for the second access network, and transmit the protocol data unit session update request to a seventh computing device.

5. The method of claim 1, wherein the protocol data unit session update request includes an address of a fourth computing device that carries out the session management function and a packet data network gateway control plane function, and wherein the second computing device is configured to transmit the protocol data unit update request to the fourth computing device.

6. The method of claim 1, wherein the third computing device is configured to:

select a fourth computing device to carry out the session management function for the second access network; and transmit the protocol data unit session update request to the fourth computing device.

7. The method of claim 1, further comprising:

receiving, from the second computing device, session management information used for the mobile communication device to communicate on the second access network, wherein the relocation request further includes the session management information.

8. A communication system comprising a processor configured to perform a method for conducting a handover of a mobile communication device from a first access network to a second access network, the method performed by the processor configured to carry out an access and mobility management function for the first access network and comprising:

transmitting a protocol data unit session update request to a second computing device, wherein the second computing device carries a session management function for the second access network;

in response to transmitting the protocol data unit session update request, receiving, from the second computing device, an identifier of a protocol data unit session and network slice information regarding a network slice to be used by the mobile communication device to communicate on the second access network using the protocol data unit session;

selecting a third computing device within a network slice instance selected based on the network slice information, wherein the third computing device carries out an access and mobility management function for the second access network;

transmitting, to the third computing device, a relocation request that includes the network slice information and the identifier of the protocol data unit session;

receiving, from a mobility management entity of the first access network, a mobility management context of the first access network, wherein the first access network is an evolved packet system;

mapping the mobility management context of the first access network to a mobility management context of the second access network; and transmitting, to the third computing device, the mobility management context of the second access network that is mapped to the mobility management context of the first access network.

9. A non-transitory computer-readable medium having stored thereon computer executable instructions, upon execution by a processor configured to carry out an access and mobility management function for a first access network, causing the processor to implement a method for carrying out a method for conducting a handover of a mobile communication device from the first access network to a second access network, the method comprising:

transmitting a protocol data unit session update request to a second computing device, wherein the second computing device carries a session management function for the second access network;

in response to transmitting the protocol data unit session update request, receiving an identifier of a protocol data unit session and network slice information regarding a network slice to be used by the mobile communication device to communicate on the second access network using the protocol data unit session;

selecting a target computing device within a network slice instance selected based on the network slice information, the target computing device configured to carry out an access and mobility management function for the second access network; and transmitting, to the target computing device, a relocation request that includes the network slice information and the identifier of the protocol data unit session;

receiving, from a mobility management entity of the first access network, a mobility management context of the first access network, wherein the first access network is an evolved packet system;

mapping the mobility management context of the first access network to a mobility management context of the second access network; and transmitting to the target computing device, the mobility management context of the second access network that is mapped to the mobility management context of the first access network.

10. The method of claim 1, wherein the second computing device further carries a control plane function for the first access network, the control plane function for the first access network and the session management function for the second access network being co-located at the second computing device.

11. The communication system of claim 8, wherein the second computing device is configured to select a fourth computing device to allocate user plane resources for the protocol data unit session, wherein the fourth computing device carries out a user plane function for the second access network.

12. The communication system of claim 11, wherein the processor is further configured to transmit, to the second computing device, a request for a deletion of the user plane resources in the fourth computing device.

13. The communication system of claim 8, wherein the protocol data unit session update request includes an address of a fourth computing device that carries out the session management function and a packet data network gateway control plane function, and wherein the second computing device is configured to transmit the protocol data unit update request to the fourth computing device.

14. The communication system of claim 8, wherein the third computing device is configured to:

select a fourth computing device to carry out the session management function for the second access network; and transmit the protocol data unit session update request to the fourth computing device.

15. The communication system of claim 8, wherein the processor is further configured to receive, from the second computing device, session management information used for the mobile communication device to communicate on the second access network, and wherein the relocation request further includes the session management information.

16. The non-transitory computer-readable medium of claim 9, wherein the second computing device is configured to select a fourth computing device to allocate user plane resources for the protocol data unit session, wherein the fourth computing device carries out a user plane function for the second access network.

17. The non-transitory computer-readable medium of claim 16, wherein the processor is further configured to transmit, to the second computing device, a request for a deletion of the user plane resources in the fourth computing device.

18. The non-transitory computer-readable medium of claim 9, wherein the protocol data unit session update request includes an address of a fourth computing device that carries out the session management function and a packet data network gateway control plane function, and wherein the second computing device is configured to transmit the protocol data unit update request to the fourth computing device.

19. The non-transitory computer-readable medium of claim 9, wherein the target computing device is configured to:

select a fourth computing device to carry out the session management function for the second access network; and transmit the protocol data unit session update request to the fourth computing device.

20. The non-transitory computer-readable medium of claim 9, wherein the processor is further configured to receiving, from the second computing device, session management information used for the mobile communication device to communicate on the second access network, and wherein the relocation request further includes the session management information.

* * * * *